United States Patent [19]
Taylor et al.

[11] Patent Number: 4,867,395
[45] Date of Patent: Sep. 19, 1989

[54] FLAT END CAP MODULE FOR SPACE TRANSPORTATION SYSTEMS

[75] Inventors: Thomas C. Taylor, Wrightwood, Calif.; Robert A. Citron, Seattle, Wash.

[73] Assignee: Spacehab, Inc., Washington, D.C.

[21] Appl. No.: 858,739

[22] Filed: May 1, 1986

[51] Int. Cl.⁴ .............................................. B64G 1/22
[52] U.S. Cl. ............................................. 244/158 R
[58] Field of Search ................... 244/158 R, 159, 120, 244/118.1, 131; 410/89; 114/72, 73, 77 A, 83; 52/630, 821, 828, 827

[56] References Cited

U.S. PATENT DOCUMENTS

| | | | |
|---|---|---|---|
| 1,933,860 | 11/1933 | Kjekstad | 114/83 |
| 2,121,670 | 6/1938 | Saives | 244/120 |
| 2,352,296 | 6/1944 | Szego | 714/83 |
| 3,063,519 | 11/1962 | Richter | 52/828 |
| 3,294,034 | 12/1966 | Bodenheimer | 410/1 |
| 3,733,756 | 5/1973 | Butler . | |
| 3,952,976 | 4/1976 | Fletcher et al. | 244/158 |
| 4,009,851 | 3/1977 | Cable . | |
| 4,057,207 | 11/1977 | Hogan . | |
| 4,132,373 | 1/1979 | Lang . | |
| 4,199,278 | 4/1980 | Kiehl | 52/828 |
| 4,273,305 | 6/1981 | Hinds . | |
| 4,395,004 | 7/1983 | Ganssle | 241/158 R |
| 4,562,979 | 1/1986 | Taylor | 214/158 R |

FOREIGN PATENT DOCUMENTS 2716173 10/1978 Fed. Rep. of Germany .
8601484 3/1986 PCT Int'l Appl. .
8700142 1/1987 PCT Int'l Appl. .

OTHER PUBLICATIONS

"The German Material Processing and Space Activities", Greger.
"Spacelab-Status and Capabilities", Bignier, NASA-ESA, (1981).
"Augmentation of Orbiter Payload Capability", Huffstetler, NASA, 1985.
"Use of Pallet-type Structures and Shell-attached and Free Flying Modes"-McGrath, (1980).
Wyle Laboratories dated Nov. 22, 1985).
The 1984 NASA Conference Publication 2313 entitled "SECOND SYMPOSIUM ON SPACE INDUSTRIALIZATION", edited by C. M. Jernigan of G. Marshall Flight Ctr.
"Industrial Space Facility Program".

Primary Examiner—Joseph F. Peters, Jr.
Assistant Examiner—Lynn M. Fiorito
Attorney, Agent, or Firm—Arthur M. Dula

[57] ABSTRACT

A module incorporating at least one flat end cap is positioned within the payload of the Space Shuttle or other space vehicle to enhance the capabilities of the payload area. The flat end cap reduces the required volume in the launch vehicle to be occupied by the module and provides for efficient use of the interior space of the Space Shuttle by providing more flat surfaces to which necessary equipment can be fastened. The module is truncated, thus adding another flat surface, i.e., a ceiling, to the interior of the vehicle. The truncated top of the module is capable of separate integration and carries additional experiments within racks which can be attached to its interior surface. The module can be fabricated from aluminum members in an aircraft type fashion of construction, or can be assembled from existing or modified Space Lab hardware. The module provides a full scope of services within its pressurized interior and will enhance the carrying capability of the shuttle with respect to handling both personnel and cargo.

26 Claims, 8 Drawing Sheets

FLAT END CAP MODULE FOR SPACE TRANSPORTATION SYSTEMS

BACKGROUND OF THE DISCLOSURE

1. Field of the Invention

The present invention generally relates to modules which are adapted to be positioned in space vehicles such as the Space Shuttle to enlarge and enhance the internal volume of the vehicle and to increase the capabilities of the vehicle when in space. More specifically, the invention relates to the use of a flat end cap module which is adapted to be positioned within the Space Shuttle or other space vehicle, and which permits the conventional interior space of such a space vehicle to better carry cargo and personnel.

2. Description of Prior Art

Previous modules transported to orbit in space have been extremely complex in structure, as well as being unduly costly. One previous solution for positioning a pressurized module within the Space Shuttle, e.g., was a hardware type insert referred to as Spacelab. This was a modular system comprising a plurality of aluminum sections which were positioned within the Space Shuttle. This system was extremely disadvantageous in that it cost approximately three hundred million dollars per launch, and in that it occupied the entire payload bay of the Space Shuttle, thus leaving no room for other revenue producing payloads; and it generally required more than 18 months to be integrated into the Space Shuttle and/or to be prepared for flight.

Previous solutions, such as the Spacelab, utilized conically spaced end caps and full circle sections positioned within the Spacelab. None of the previously known units utilized flat end caps with substantially cylindrical sections, nor tie rods for connecting opposite end caps of the module. Nor do any of the units disclosed by the prior art involve the use of a truncated or flat top which can be opened to provide a top loading capability for the module. Nor are any of the prior art units capable of being integrated easily into a space module or easily transported by highway or air to the location of a user.

LANG, U.S. Pat. No. 4,132,373 (as well as German equivalent No. 2,704,844) disclose a space depot to be carried in a Space Shuttle. This depot preferably has a cylindrical shape and is equipped with a radial shelf installation assembly which can store goods and equipment. The depot is tightly closed at each of its two end faces by respective connecting plates.

HOGAN, U.S. Pat. No. 4,057,207, discloses a space vehicle module which can be used as the basis for forming larger space structures. The structure of the module includes two jointed and truncated icosahedra, at least one of the icosahedra being doubly truncated. Each of the surfaces of the module is flat and at least one of the surfaces incorporates an aperture which can be fitted with an air lock. This module can be inserted into the space shuttle.

GANSSLE et al., U.S. Pat. No. 4,395,004, disclose a space craft structure which is suitable for mounting in the bay of a Space Shuttle. The structure incorporates a plurality of modules in the form of a truss network. Electronic payloads, thrusters, fuel tanks, solar rays and other equipment can be attached to the trusses.

CABLE, U.S. Pat. No. 4,009,851, discloses a spacecraft having an inner hollow cylindrical member and a plurality of bulkhead plates which extend outwardly from the inner member. An enclosure member is attached to the bulkhead plates and to the ends of the inner member in order to form a plurality of closed interior compartments. Each closure member is formed from an aluminum honeycomb structure enclosed about its periphery by a suitable lightweight aluminum channelized member. A plurality of electronics and other similar payload gear is mounted on one enclosure plate. The structure is fully enclosed to protect equipment located on the interior of the spacecraft from the environment and provides a plurality of externally removable panels which permit interchangeability of different modular subsystems and panel combinations.

The TANNER et al. article entitled "Space Lab: Subsystem Performance Capabilities" discusses the resources of Spacelab and the manner in which they can be efficiently applied to payloads and used in experiments for manned and unmanned vehicles. In this device, pressurized equipment interfaces include standardized racks and storage containers positioned within the module. Hardware used for experiments can be pre-installed before racks are integrated in the module.

GREGER, entitled "The German Material Processing and Space Activities" basically discusses German contributions to Space Lab.

McGRATH, an article entitled "Use of Pallet-Type Structures in Shell-Attached and Free-Flying Modes", discloses three modular pallet-type structures: Space Lab pallets, a cubic framework structure, and a honeycomb panel structure.

HINES, U.S. Pat. No. 4,273,305, discloses, in pertinent part, a combination satellite service and replacement module support assembly which can be located at any required position along the length of a shuttle bay.

Finally, BUTLER, U.S. Pat. No. 3,733,756, discloses interlocking panels for building walls which incorporate shelf space therein.

As stated above, none of the prior art devices which have been developed overcome the disadvantages which existed in the prior art, unlike the present flat end cap module, which enhances the capabilities of the interior volume of a space vehicle for cargo, personnel, and experimentation.

OBJECTS OF THE INVENTION

A general object of the present invention is therefore to provide a new and improved flat end cap module which can be positioned within a space vehicle, e.g., the Space Shuttle, to enhance utilization of the interior volume of the vehicle while occupying a minimum of space within such a vehicle.

Another object of the present invention is to provide a flat end cap module which has at least one non-conical, flat end, and which permits the full volume of the shuttle payload bay to be utilized, which does not occur when a conically shaped end is used; the flat end cap can bear against a substantially flat rear surface of the passenger or cargo bay of the interior of the Space Shuttle, or can be positioned close thereto in spaced relation.

Still another object of the present invention is to provide a new and improved flat end cap module which includes a tied-through structural design which utilizes a plurality of tie rods which connect two or more wall loads with each other; these tie rods can also be utilized as racks, ladders, storage areas, and gripping areas to facilitate movement of personnel and cargo through the flat end cap module, and from the module to the interior of the vehicle.

Still another object of the present invention is to provide a new and improved flat end cap module in which the flat end cap can incorporate a deep waffle type structure; such a structure includes a plurality of generally transverse, intersecting structural members which will minimize the tendency of the end caps to bend under stress, which are capable of forming a structure for receiving mid-deck lockers or equipment racks, and which provide shelving and other storage space within the module.

A yet further object of the present invention is to provide a new and improved flat end cap module in which the top panel of the module can either be truncated or flat to enhance payload bay viewing from the aft flight deck windows of the shuttle, to permit EVA crew member transit in emergency door latch operation and which can be opened to facilitate movement of cargo and personnel between the vehicle bay and the module.

A further object of the present invention is to provide a new and improved flat end cap module which includes a top panel which can be removed from the module and which can be replaced by a similar top panel which is already prepared for integration with the electrical and other utility systems of the module, and which is therefore ready for launch.

A further object of the present invention is to provide a top loading panel for an inserted flat end cap module which is removable to provide access to the interior of the module, both when it is vertically positioned on the launch pad and when it is horizontally positioned and integrated within a craft.

Still a further object of the present invention is to provide a module which can be fabricated using aircraft rather than spacecraft designs and materials, with a resultant savings in time, expense and efficiency in manufacturing such modules.

Still another object of the present invention is to provide a flat end cap module in which the flat end cap can be indented or recessed so that it will be adapted to receive a tunnel adaptor or connector to facilitate the connection between interior volume of the module and the interior cargo and passenger volume of the Space Shuttle or other space vehicle.

A yet further object of the present invention is to provide a shortened hardware cylindrical section which will be essentially fabricated from standard Space Lab cylindrical straight sections and which will be adapted to form a short conical and flat end cap module which will be capable of undergoing reduced ground and flight testing.

Still a further object of the present invention is to provide a new and improved flat end cap module which can be easily transported to customers by either highway or via the air.

Another object of the present invention is to provide a system whose capability can be enhanced by adding air circulating devices, power devices, a variety of sensors, fire suppression equipment, windows and other unique equipment which may be required by specific users.

Another object of the present invention is to provide a module which can be used inside the interior of the Space Shuttle and which occupies less space, is less costly to design, weighs less, and is better adapted to mate, via its flat end cap surface, with existing interior Space Shuttle structures than are previously known assemblies.

Still another object of the present invention is to provide a module which can be inserted within the Space Shuttle, which takes a relatively short time to fabricate, and which can be prepared and integrated for Shuttle launches within about five months.

Yet another object of the present invention is to provide a module which is itself modular in construction and which thus permits the preparation of subsystems within the module without requiring dismemberment of the entire system.

Still a further object of the present invention is to provide a new and improved modular structure in which a welded skin and stringer type construction can be used to form a generally truncated cylindrical body to be attached to one or more flat end caps.

Still another object of the present invention is to provide a flat end cap module in which the flat end cap will abut, or be closely spaced from, the rear bulkhead of the passenger and cargo compartment of a Space Shuttle or other space vehicle.

The module will be Shuttle compatible and will be adapted to transport cargo, passengers and other items to orbit via the Space Shuttle. It can be provided in the form of a small or a large module, i.e., modules which will seat approximately 10 or 20 people, respectively. It will serve to increase the capacity of the Shuttle for handling personnel, and will be adapted to provide support to an orbiting satellite, space platform, or space station. It will be adapted to be nondeployable and will be used mainly in the bay of the Space Shuttle. It can also serve as living quarters for up to 21 days for spacecraft personnel. In this fashion, the maximum amount of livable space within the Shuttle can be expanded at a cost which is much less than that of expanding the spacecraft itself. It will enhance the performance of various tests in space and is itself modular in order to facilitate repairs of the module. It will include a tied-through bar or rod design to impart increased structural strength to the apparatus and has a deep waffle structural flat end cap which will resist bending and which will facilitate the use of the device as a rack, storage area or locker. Additionally, when the shuttle bay doors are open, it will provide an increased closed environment/area which can safely store Shuttle personnel. It is also adapted to contain appropriate life support equipment so that it can be connected to Shuttle systems, such as air and gas flow systems, water supply systems, communication and electrical systems. This is necessary to easily expand the Shuttle's on systems in an expeditions fashion.

The above and other objects, features and advantages of the present invention will be discussed more fully with respect to the drawings which follow.

SUMMARY OF THE INVENTION

The present invention is provided for in a first aspect thereof by a module which is adapted to be inserted into a space vehicle having a floor, a passenger compartment having a rear substantially vertical wall, and a ceiling, said module comprising a substantially arcuate body having first and second open ends and an open top. First and second ends walls are attached to the open ends of the body, the body comprising an arcuate sidewall connecting said first and second end walls. The body has an open top and at least one of the end walls is substantially flat. The module also includes a substantially flat top panel which is adapted to be attached to the open top of the body in order to close the top. The module also includes means for attaching the module to an interior wall or surface, e.g., the floor, of the space vehicle At least one of the flat end walls of the module is adapted to be positioned adjacent to the substantially vertical interior wall of the vehicle. The module flat end wall includes means for receiving a tunnel adaptor to form a passageway between the module and a passenger or cargo containing compartment of the space vehicle.

Each of the end walls of the module can be substantially flat, or one of the end walls, located away from a substantially flat/vertical interior wall of the space vehicle, can be formed to have a substantially frustoconical configuration. In such case the flat end wall of the module will be positioned adjacent to the interior space vehicle wall.

The body of the module has a cross-sectional configuration which is substantially that of a truncated cylinder. The means for attaching the module to an interior wall of the space vehicle comprises at least one trunnion fitting which extends outwardly from the sidewall forming the body, the trunnion fitting being adapted to fit within a complementarily-shaped aperture in the floor or other interior surface of the space vehicle.

Each of the end walls of the module can comprise first and second sets of parallel reinforcing ribs, the sets of ribs being arranged in a generally transverse fashion, with the parallel ribs of the first set intersecting the parallel ribs of the second set. The two sets of ribs are arranged in a substantially waffle-type structure extending inwardly from an inner surface of each end panel into the interior of the body. The first and second sets of ribs intersect at a plurality of junction points, and the module further comprises a plurality of tie-rods which connect the end walls to each other. The intersection or junction points all include means for attaching the free ends of the tie-rods to the end panels. The means for attaching these ends can comprise apertures which are adapted to receive ends of the tie-rods, or other fastening elements for connecting the tie-rod ends thereto. These fastening elements can comprise, e.g., a universal ball and socket connector.

The body can comprise in an alternate embodiment an exterior skin and a plurality of generally U-shaped reinforcing rings positioned within the skin. At least one of the end walls can incorporate an indentation in an exterior surface thereof for receiving a tunnel adaptor to either facilitate abutment of the exterior surface of the end cap against an interior vertical wall of the space vehicle, or at least to bring the two end wall and the vertical wall into closely spaced relationship.

Optionally, the module can be equipped with an air diffuser and a fan, as well as other life support systems to be integrated with similar systems on the shuttle. The top panel can further comprise a hatch opening and a hatch door which is pivotally connected to the top panel for selectively closing the hatch opening. The body is in the form of a substantially truncated cylinder having open first and second opposed sides to which the end caps are attached, and also includes an open top. First and second ring frames and means for attaching the rings to the first and second opposed sides can also be provided in this embodiment. This form of the module also includes a substantially rectangular top panel which is adapted to be positioned on the open top end of the body. This assembly also includes two substantially flat end walls, each of which is attached to a respective one of the rings. All of the walls and the body can be provided with flanges to facilitate attachment by welding, bolting, or other conventional techniques.

The present invention is provided for in a second aspect thereof by a module which is adapted to be inserted into the interior volume of a space vehicle having a ceiling, a floor, and at least one interior wall which is substantially vertical. The module comprises a body portion having a single generally curved wall, first and second open ends, and an open top. First and second end walls are attached to said first and second open ends, respectively, and at least one of the end wall is substantially flat. Each of the end walls has an interior surface facing the body and an exterior surface facing the vehicle when the module is inserted therein. A plurality of strengthening or reinforcing ribs are attached to the interior surface of each end cap. A plurality of tie-rods, each of which has first and second ends, are attached to the first and second end walls to secure the end walls to each other and to the body. A top panel is positioned on the open top of the body wherein at least one of the top panel and end walls includes a hatch to permit passage of cargo and personnel between the module and the vehicle.

One of the end walls can include the hatch, in which case the hatch will comprise an opening adapted to receive a connector tunnel which is adapted to be attached to the interior vertical wall of the space vehicle to permit passage of cargo and personnel between the space vehicle and module. In this case, the hatch can also comprise a pivotable door for selectively closing the opening in the panel.

Alternatively, the top panel can include the hatch, in which case the hatch will comprise an opening which is adapted to be selectively opened and closed by a hinged door to permit passage of personnel outwardly from the top of the module.

Connecting elements can be attached to the reinforcing ribs on the end walls, and the free ends of the tie-rods are attached to the connecting elements. The top panel has an exterior surface and an interior surface and can include a plurality of reinforcing ribs on the interior top panel surface.

One of the end panels can be provided with a recessed area on an exterior surface thereof, and the hatch will then be located within the recessed portion.

The present invention is provided for in another aspect thereof by a module adapted to be inserted within a space vehicle having a floor, a ceiling, and at least one substantially vertical interior wall. The module comprises a body comprising a substantially arcuate side wall having open first and second ends and an open top, the open top being defined by substantially opposed parallel straight edges. It also includes first and second end walls attached at said first and second open ends of said body, respectively, each of said first and second end walls having an outer arcuate edge, said walls describing an arc greater than 180° and less than 360° of a circle. A top, panel is adapted to be attached to said body to close said open top and means are provided for attaching said module to an interior surface of said space vehicle.

The present invention is provided for in yet another aspect thereof by a module adapted to be inserted within a space vehicle having a floor, a ceiling, and at least one substantially vertical interior wall. The module comprises a body having a substantially arcuate side wall with open first and second ends and an open top, the open top being defined by substantially opposed parallel straight edges. It also includes first and second end walls attached to said first and second open ends of said body, respectively, a substantially flat top panel adapted to be attached to said body to close said open top, and means for attaching said module to an interior surface of said space vehicle.

Finally, the present invention is provided for in yet another aspect thereof by a module adapted to be inserted within a space vehicle having a floor, a ceiling, and at least one substantially vertical interior wall. The module comprises a body having a substantially arcuate side wall having open first and second ends and an open top, first and second end walls attached to said first and second open ends of said body, respectively, with at least one of said end walls being substantially flat, a top panel which is adapted to be attached to said body to close said open top formed by said body and said end walls, and means on said at least one substantially flat end wall for attaching said module to an interior surface of said space vehicle.

BRIEF DESCRIPTION OF THE DRAWINGS

The above and other objects, features and advantages of the present invention will become more fully apparent to those of ordinary skill in the art to which the present invention pertains from a review of the following brief and detailed descriptions of the drawings, in which like reference numerals are used to represent similar parts throughout the several views, and wherein.

DETAILED DESCRIPTION OF THE DRAWINGS

More specific reference will now be made to the drawings herein.

Figure 1:
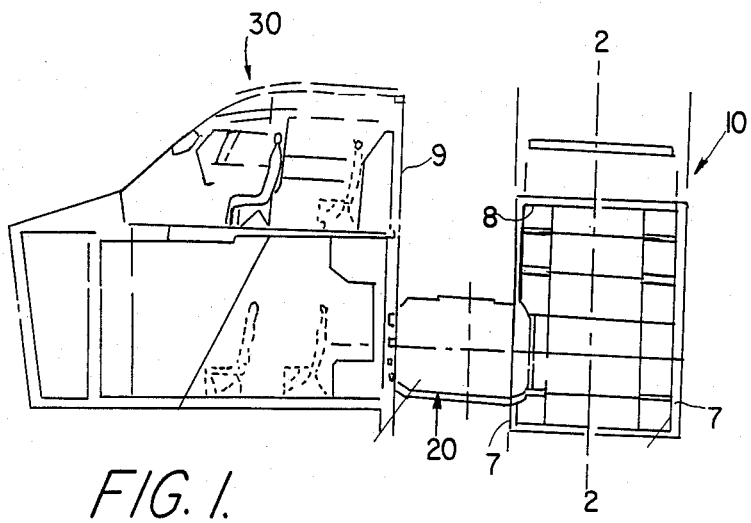
FIG. 1 is a sectional view of a front of a space vehicle, a module formed with two flat end caps or walls in accordance with the present invention, and a tunnel adaptor for communicating the interior of said space vehicle with the interior of said module.

FIG. 1 illustrates the attachment of a first embodiment of a module 10 formed in accordance with the present invention as attached to the rear bulkhead or substantially vertical wall 9 of the interior volume of space vehicle 30 via a tunnel adaptor 20. The module can clearly be placed at the bottom of the space vehicle and under its ceiling, and will provide an enhanced capability for the interior volume of the shuttle.

Figure 2:
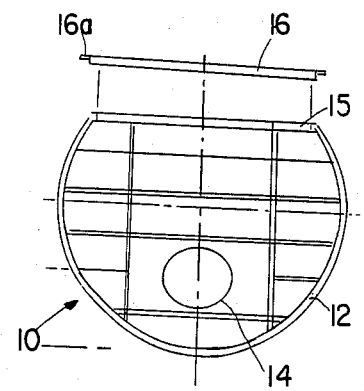
FIG. 2 is a sectional view taken along line 2—2 of FIG. 1, showing the module used in FIG. 1.

As illustrated in FIG. 2, one of the two opposed end walls or caps of the module 10 is formed with an opening or hatch 14, a generally truncated cylindrical body 12 having an open top 15, and a top panel 16 with a peripheral flange 16a which is adapted to close the open top either by resting on flange 16a or by resting on upper flange 8 (see FIG. 1) of the generally truncated cylindrical body 12. The body can be formed of metal or composite plastics material, as can the end walls.

Figure 3:
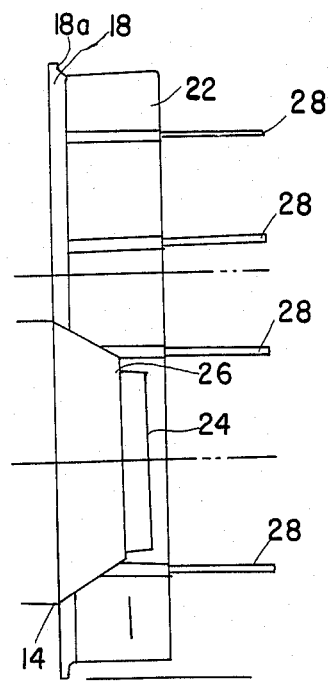
FIG. 3 is a sectional view of an end cap or wall formed in accordance with the present invention, and includes portions of the rods connected to the walls.
Figure 4:
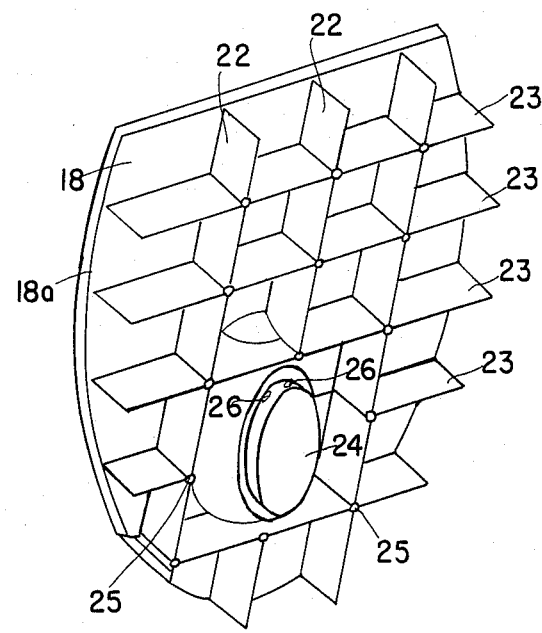
FIG. 4 is a perspective view of the end cap of FIG. 3.

FIG. 3 illustrates each of the substantially flat end wall or caps 7 (see FIG. 1) in greater detail. More specifically, each end cap includes an exterior skin 18 having a peripheral flange portion 18a, and a waffle-like structure on its inner surface which comprises a plurality of substantially parallel ribs 22 in a first set and a plurality of substantially parallel ribs 23 in a second set. The first and second sets of substantially parallel ribs intersect each other at a plurality of junction points (unreferenced) as best seen in FIG. 4. These ribs serve to both strengthen the walls as well as to provide shelves or receptacles for cargo to be positioned within the module. Opening or hatch 14 can be closed by a pivotable hatch door 24 which can would be pivoted at hinge 26, as illustrated in FIG. 3. The junction points 25 at which the strengthening ribs intersect can comprise slots or apertures for receiving the ends of a plurality of elongated tie rods 28, as seen in FIGS. 1 and 3, or can have a plurality of attaching members 29 (see FIG. 7)

connected thereto. The attaching members can be conventional connecting elements, e.g., a socket for receiving a ball at the end of each rod. As seen in FIG. 4, the opening 14 and hatch door 24 are located where there are no ribs provided on the inner surface of each flat end cap. The peripheral ridge or flange 18a of the end wall is provided along the outside of the end cap so as to properly fit within complementarily-shaped openings flange located on the opposed sides of the substantially truncated cylindrical body 12.

Figure 5:
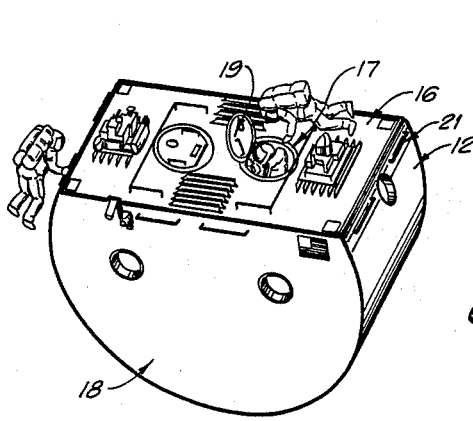
FIG. 5 is a perspective view of the module of FIG. 1.

FIG. 5 better illustrates the module as incorporating the generally arcuate body wall 12, exterior skin 18 of one end cap, and top panel 16. The top panel can be provided with a hatch 17 so that personnel can leave through the exterior of the module to enter the interior volume of the space vehicle via pivotable hatch door 19 (see FIG. 5). A plurality of handles 21 can be positioned along the exterior skin of either the arcuate body 12 or end cap 18 to facilitate movement and handling of the module. The flat exterior surface of panel 16 permits personnel to stand thereon while viewing the interior volume of the space vehicle within which the module is positioned.

Figure 6:
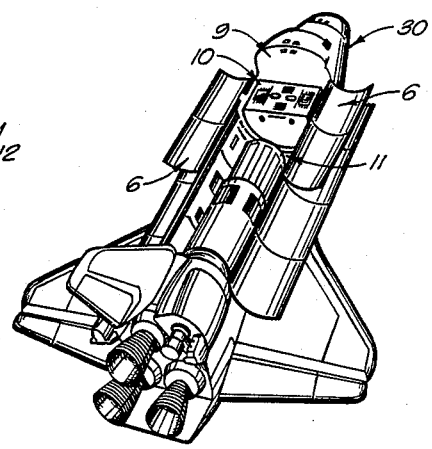
FIG. 6 is a perspective view of the module of FIG. 1 positioned adjacent to a substantially vertical wall of a space vehicle.

FIG. 6 illustrates the module as it is positioned in cargo bay 11, directly behind the bulkhead or substantially vertical wall 9 of the space vehicle 30. When the doors 6 of the Shuttle open, the module can be precisely positioned within the vehicle; or it can be easily removed at the conclusion of a Shuttle journey.

Figure 7:
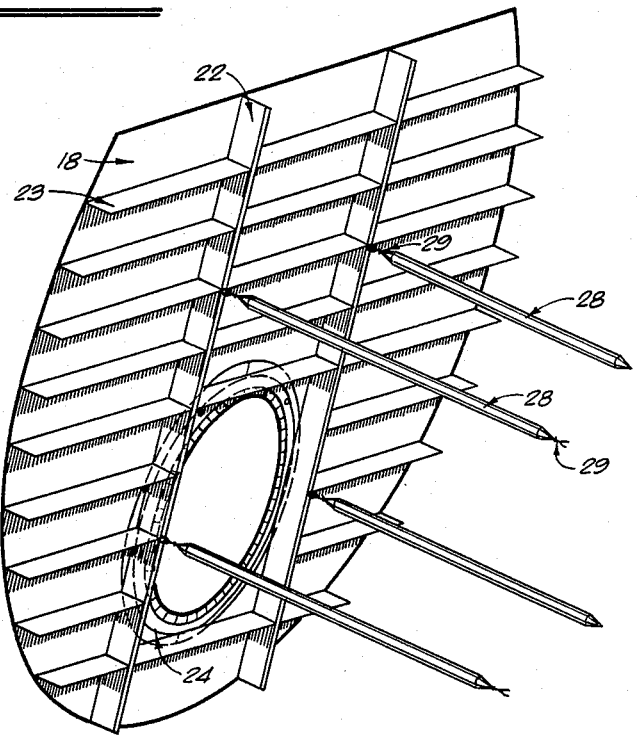
FIG. 7 is an enlarged perspective view of a flat end cap illustrating one manner in which the connecting tie rods are attached to the end cap.

FIG. 7 better illustrates the skin and reinforcing structure of each end wall 7. As illustrated in this drawing, hatch opening 14 is located between a plurality of intersecting reinforcing ribs 22, 23. A plurality of tie rods 28 are shown which are attached via connectors 29 (e.g. a ball and socket connection) to the points of intersection 25 between the two sets of parallel reinforcing ribs.

Figure 8:
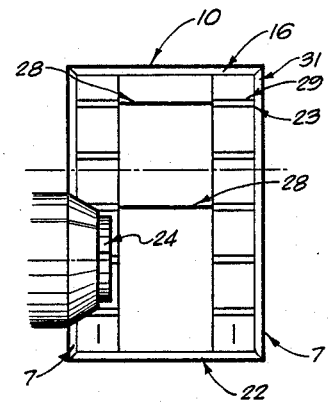
FIG. 8 is an enlarged sectional view of a module illustrating several tie rods connecting opposed first and second end caps.
Figure 9:
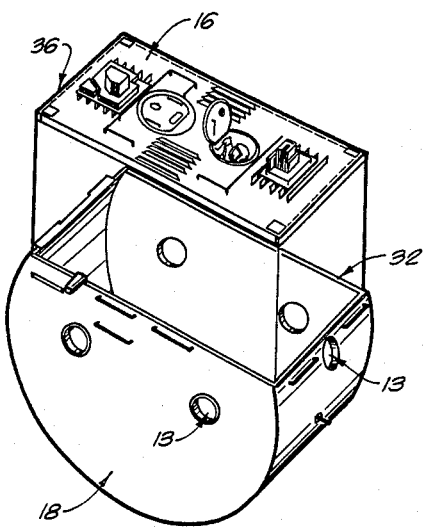
FIG. 9 is an exploded perspective view of the module of FIG. 5.

FIG. 8 illustrates two opposed end caps 7 which are connected by, e.g., the two tie rods 28 illustrated. The tie rods are connected via connectors 29 to panels 22 and 23 in order to secure the opposed walls 7 to each other and to the body member 12. FIG. 9 well illustrates the inwardly directed peripheral flange 32 located along the top portion of body 12. The top panel 16, as best illustrated in FIG. 9, also includes an outer peripheral area 36 which will rest, along angled surfaces 31, upon similarly configured surfaces of the inwardly directed peripheral flange or rim 32 of body 12. The top panel is then, e.g., secured by bolting or other detachable fastening elements to body 12 and end walls 7. A plurality of portholes 13 can be provided both in the exterior skin 18 of each end cap 7 as well as in body portion 12.

Figure 10:
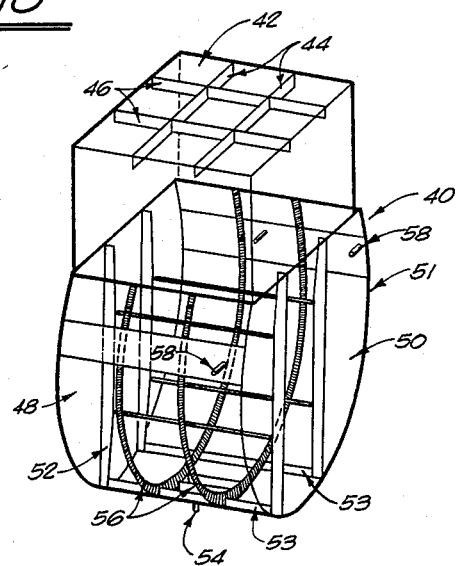
FIG. 10 is a perspective view of a second embodiment of a module with flat end walls formed from a skin and reinforcing rib construction.

A second embodiment of the module is illustrated as 40 in FIG. 10. In this embodiment the opposed end walls 48 and 50 comprise an outer skin having two substantially vertical reinforcing rods 52; a downwardly extending trunnion fitting 54 (which can also be used in module 10) is provided for attaching the module to the vehicle via a receiving recess or opening located on the floor of the space vehicle. One or more similar trunnion fittings 58 are provided on body 51 to mate with recesses in the interior wall of the space vehicle. The body of module 40 is provided with a similar skin and two substantially arcuate, U-shaped reinforcing members 56. Reinforcing ribs 53 are provided on the bottom of the arcuate body 51. The top panel 42 is formed from an exterior skin similar to that of body 51 and includes reinforcing ribs 44 in a first set arranged parallel to each other and transversely to reinforcing ribs 46 of a second set. This top panel can be inserted into the opening of the generally truncated cylindrical body 51, as illustrated in FIG. 10.

Figure 11:
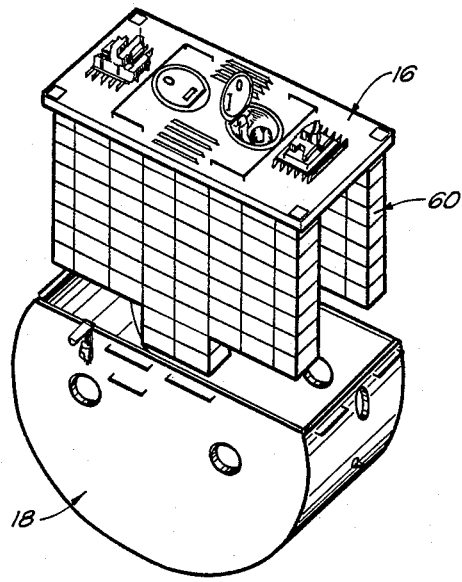
FIG. 11 is a perspective view of the module of FIG. 1 with a plurality of cargo-supporting racks attached thereto.

FIG. 11 illustrates one method of loading the module through its upper body opening. As illustrated in FIG. 11, top panel 16 can have a plurality of locker units or racks 60 which are attached to the underside of the panel and which can be slipped into body 12 of the module.

Figure 12:
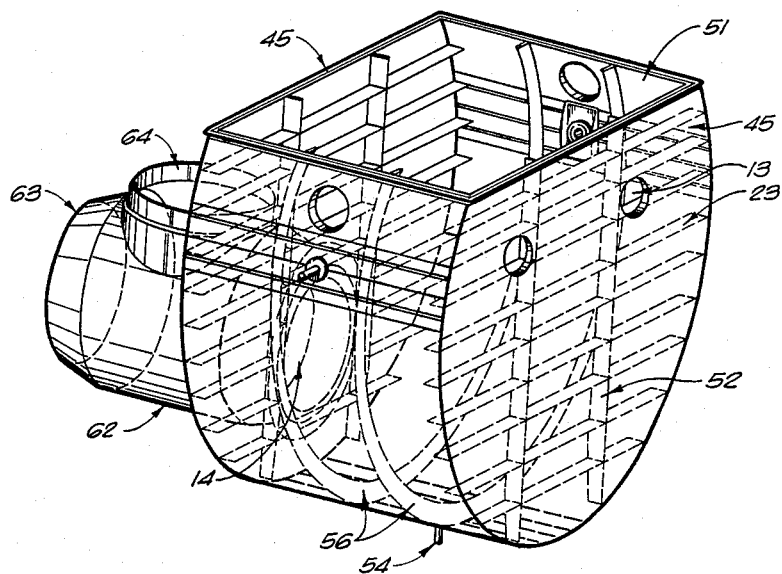
FIG. 12 is a perspective cutaway view of the module of FIG. 10, illustrating its attachment to a tunnel adaptor.
Figure 13:
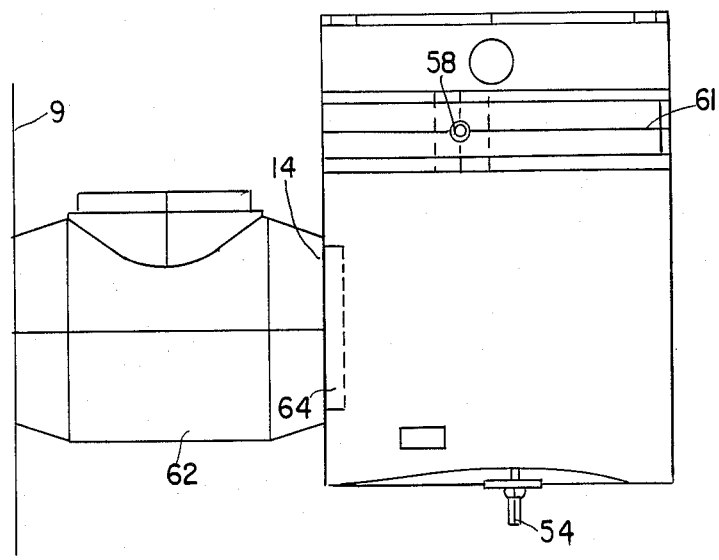
FIG. 13 is a sectional view of a tunnel adaptor and the module of FIG. 12.

The fabricated module of FIG. 10 is again illustrated in FIG. 12. This module comprises a skin and stringer design which has opposed end cap panels 45 (one of which includes hatch opening 14) and a plurality of arcuate reinforcing ribs 56 for body 51. The hatch opening 14 is connected to a tunnel adaptor 62, which has an opening 63 arranged opposite to hatch opening 14, and an upper opening 64. Reinforcing members 23 and 52 are welded to the exterior skin in a fashion similar to the manner in which aircraft skins are welded. The rings or frames 56 provide support for the truncated cylindrical body section 51. These structural members tie into the load carrying interior vehicle beams 61 (illustrated in FIG. 13) via welded connections. This transfers the load to the trunnion side fittings of the orbiter vehicle via side trunnions 58 (see FIG. 10) and bottom fittings 54.

Figure 14:
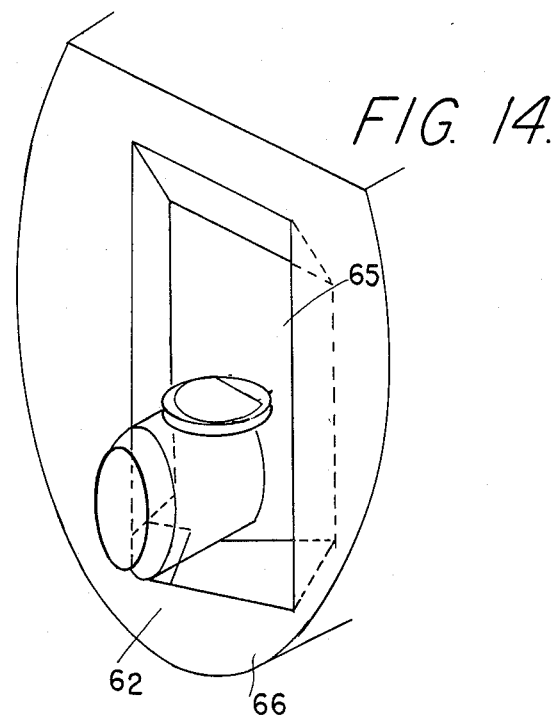
FIG. 14 is a schematic plan view of an end cap formed in accordance with another embodiment of the present invention so as to incorporate a recess therein.
Figure 15:
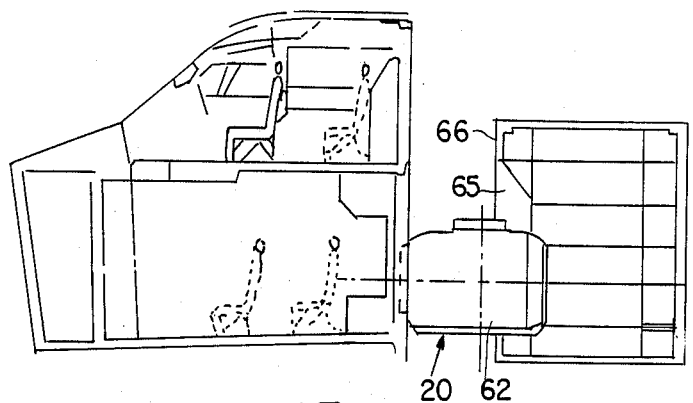
FIG. 15 is a sectional view of a module using the embodiment of the end wall illustrated in FIG. 14, when it is attached to a tunnel adaptor and a portion of a space vehicle.

Yet another embodiment of an end cap 66 is illustrated in FIG. 14. This end cap is used to minimize the payload bay volume used by the module of the present invention by providing an indentation or elongated, substantially rectangular recess 65 in the flat end cap 66. In this fashion the end cap 66 will either be able to abut (or, more likely, be positioned closely adjacent to) the rear bulkhead 9 of the payload volume. This cap is indented to permit the tunnel adaptor 62 to extend into the interior volume defined by the body of the module. The manner in which this connection is effected is best illustrated in FIG. 15.

Figure 16:
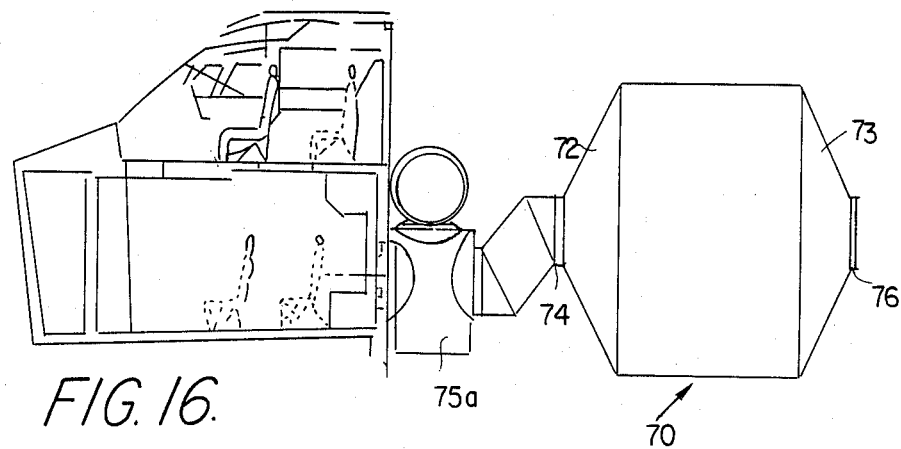
FIG. 16 is a plan view of a conventional frustoconical-ended module and an adaptor to connect such a module eto a space vehicle.
Figure 17:
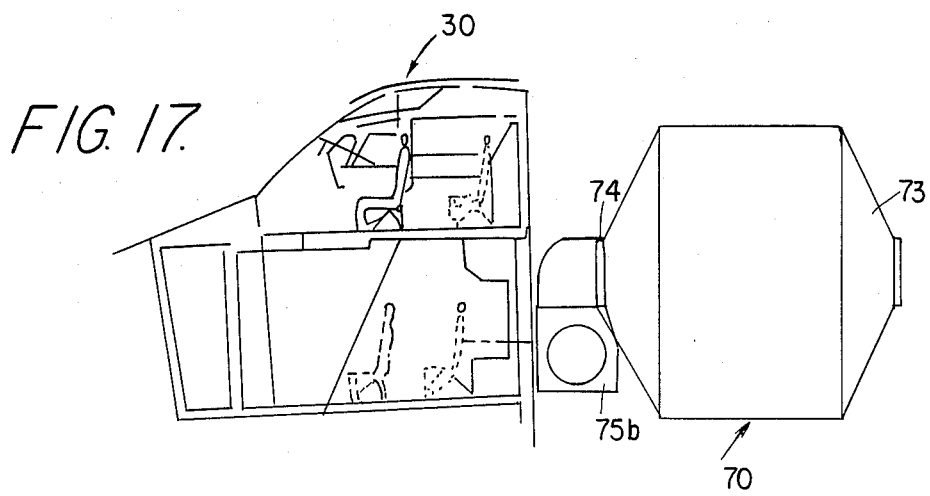
FIG. 17 is a plan view of a conventional frustoconical-ended module and another embodiment adaptor for connecting such module to a space vehicle.
Figure 18:
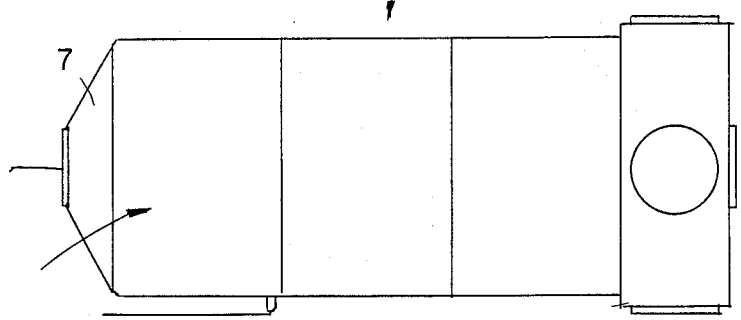
FIG. 18 is a plan view of another embodiment of a flat ended module formed in accordance with the present invention.

FIGS. 16 and 17 illustrate the more conventional space lab module 70 which is now in existence. It will be necessary to provide an opening 74 in one frustoconical section 72 (an opposite frustoconical section 73 also being provided) in both of these embodiments which will then be connected via airlock compartment or segment 75a, 75b (in FIGS. 16 and 17, respectively) to be able to connect the frustoconical modules to the interior volume of a passenger and/or cargo compartment of a space vehicle. Applicant believes that the use of such airlocks may themselves be patentable, but are not a part of the flat end cap modules formed in accordance with the present invention. These figures have been included in the application, however, to illustrate how inconvenient it would be to try to approximate the space saving and convenience features of the present invention using dated technology such as the frustoconical-ended Space Lab module. FIG. 18 illustrates how a flat end cap module 10 could be attached to a modified Space Lab module 70.

Figure 19:
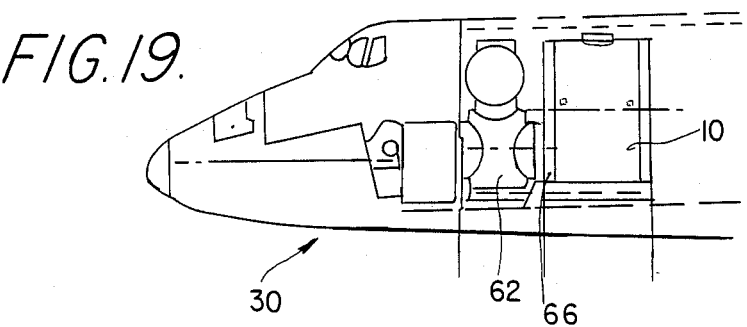
FIG. 19 is a plan view of a module formed in accordance with either of FIGS. 16 or 17, as connected to a tunnel adaptor as shown in those Figures.

FIG. 19 illustrates a flat end cap module 10 being attached to a tunnel connector 62 via hatch opening 66. This might also be particularly applicable for attachment to the rear bulkhead of the European Columbus apparatus.

Figure 20:
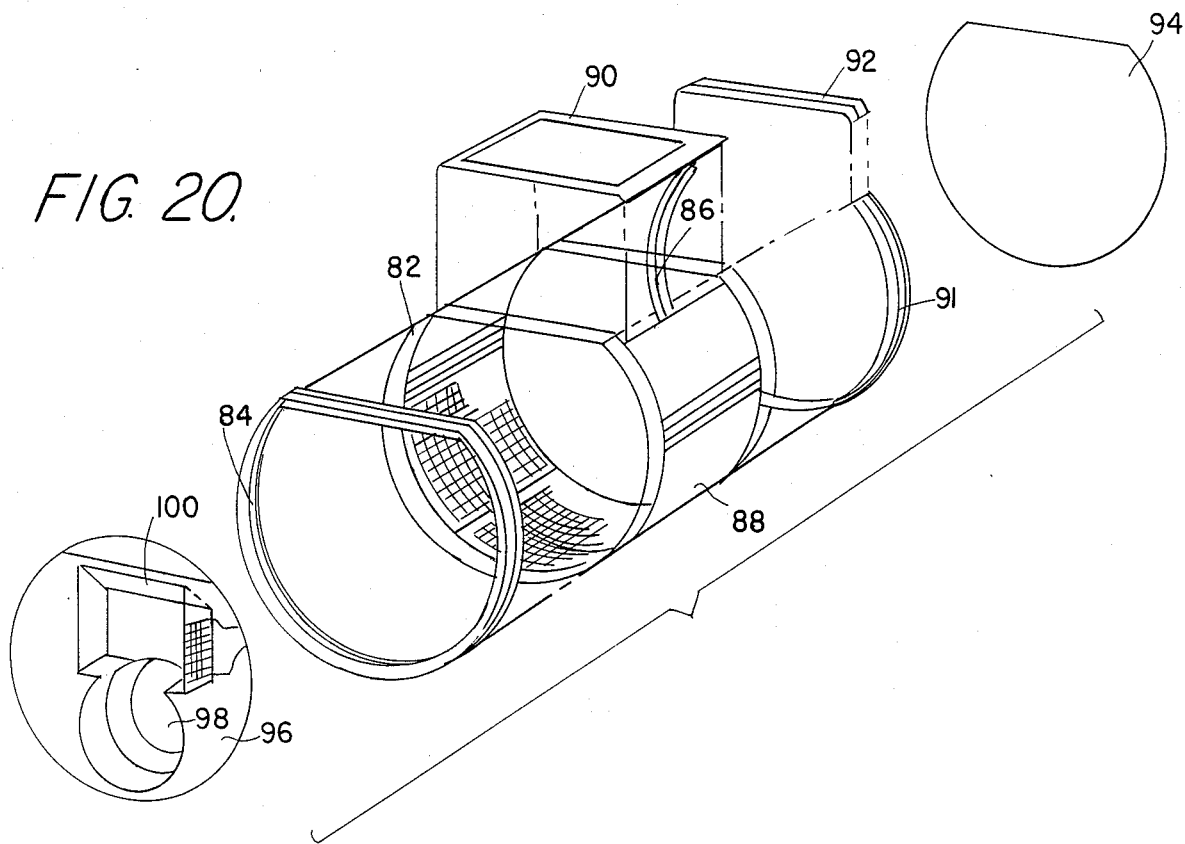
FIG. 20 is an exploded perspective view of a seventh embodiment of a module formed in accordance with the present invention.

FIG. 20 illustrates yet another embodiment of a truncated space module; this one is fabricated from existing hardware, and includes forward and rear flat end caps 96 and 94, respectively. Forward end caps 96 would incorporate a recess 100 and a hatch opening 98. Each of these end walls are positioned within a respective reinforcing ring 84, 86 having a substantially flat top 92 which is attached to the generally U-shaped reinforcing ring. Each of the reinforcing rings are attached to an open end of generally truncated cylindrical body 88. The truncated cylindrical body has an upper opening 91 to which a substantially flat top panel 90 can be attached, as top panel 16 was attached to the top opening of body 12.

Figure 21:
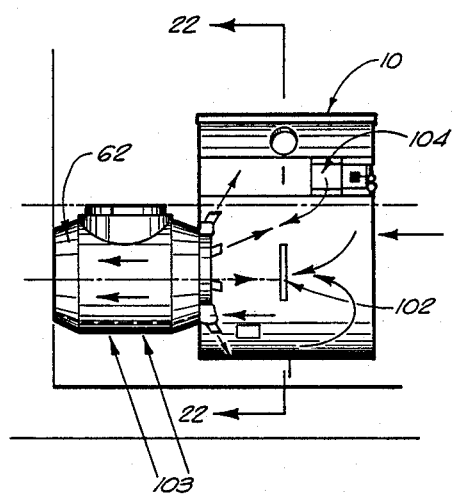
FIG. 21 is a sectional view of a module formed in accordance with the present invention which incorporates a fan and diffuser.
Figure 22:
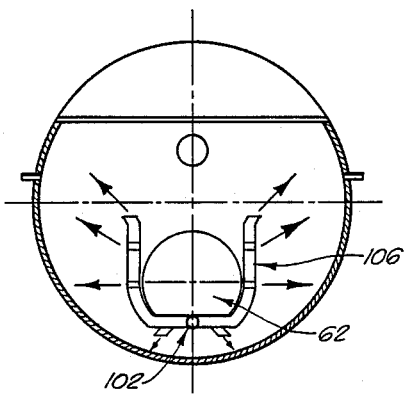
FIG. 22 is a sectional view taken along line 22—22 of FIG. 21.

FIG. 21 illustrates one manner in which the internal subsystems of the module can be enhanced. More specifically, a fan 102 utilizes the existing air supply coming in through tunnel adaptor air supply channel 103. The fan is capable of taking the outlet air and conducting it through the module and outwardly via the arrows illustrated in the central part of the module via tunnel adaptor 62. FIG. 22 is a sectional view illustrating the diffuser 106 and better illustrating the fan 102 which is seen in FIG. 21.

Figure 23:
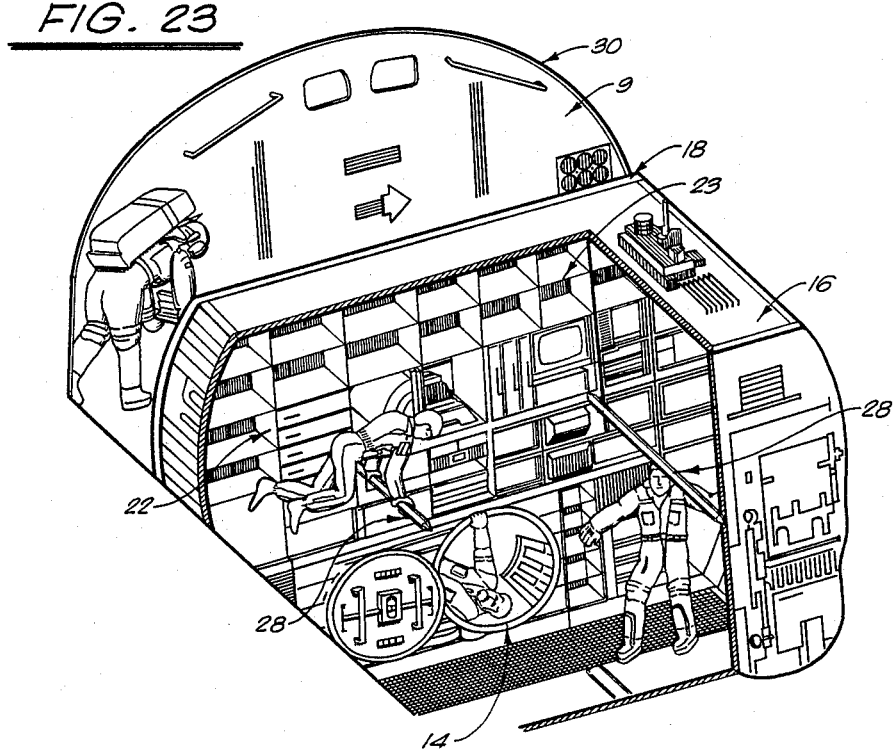
FIG. 23 is an enlarged perspective view of a simulated spacecraft incorporating a module formed in accordance with the present invention.

Finally, FIG. 23 illustrates, in perspective view, the use of one module 10 in accordance with the present invention. More specifically, it shows the positioning of one flat end panel 18 adjacent to (although not abutting) substantially vertical rear bulkhead 9. The reinforcing waffle-type structure 23 is illustrated, as is top panel 16, and the tie rods 28 which serve to secure the opposed end caps to each other as well as to facilitate movement of personnel through the module.

As is noted through this application, the use of tie rods 28 serve to secure the two substantially flat end caps (or one flat end cap which is substantially frusto-conical end cap) to each other. The use of the waffle-type structure in the form of intersecting reinforcing sets of ribs 22, 23, counteract the tendency of the flat end caps, which would be to otherwise bend; these structural members also serve to assist in retaining mid-deck lockers or equipment racks and to thus increase the storage capacity of the module.

By following the alternate embodiment of the module illustrated in FIGS. 10 and 12, and thus using a skin and stringer type design, the module can be fabricated using aircraft rather than spacecraft design and production techniques.

Although not illustrated, and in addition to the fan and airflow internal systems illustrated in FIGS. 21 and 22, the module can be equipped with additional air circulation, light power sensors, fire suppression, windows and other additional equipment for integrating the module with the space vehicle.

The module as proposed will have a weight which will vary between 3,000 and 6,700 pounds; this is less than that of presently known modules and is important insofar as it permits a maximum amount of usable cargo to be positioned in the payload bay of the Shuttle.

Because the module can be easily removed from the interior bay of the Shuttle, and because it is formed from a plurality of components, it can be prepared for subsequent flights in a relatively short period of time, i.e., in about 5 months it can be integrated and prepared for a launch. In this fashion, the module can be launched virtually as often as the Shuttle and schedule delays will not result.

The tied-through structural design which utilizes the tie rods 28 provides a system of reacting with the loads within the module. By tying together the two end caps the loads on these walls counteract one another, reducing stress on each and increasing the life of these walls.

The module can be easily fabricated using either conventional spacecraft or aircraft techniques. As illustrated in FIG. 11, a plurality of mid-deck lockers 60 can be attached to the top panel which will be inserted into the body. Because the interior of the module is essentially four-sided (one top side, one arcuate body, and two opposed flat end caps) rather than a substantially two-sided design as in existing modules, a greater number of such lockers (or other racks) can be attached to these side walls.

The flat end cap module can alternately be provided in a full circle rather than in a truncated version. Any of the embodiments can be fabricated in several fashions, including welding, bolting and conventional Space Lab hardware.

The flat end caps shorten the required volume to be used within the payload bay of a space vehicle and permits efficient use of the interior by providing more flat surfaces to which equipment can be fastened. By positioning the module directly behind the rear bulkhead of the flight cabin, additional living volume for crew members can be provided.

It should be emphasized that the mid-deck lockers can be positioned in any rectangular area formed by four intersecting ribs in the waffle-type structure.

While the present invention has been described with respect to several specific embodiments thereof, it is clear that there are other embodiments, features and advantages of the present invention which would be within the skill of one of ordinary skill in the art, and the scope of the present invention should not be limited to the embodiments shown, but include such other embodiments.

What is claimed is:

1. A module adapted to be inserted into the interior volume of a space vehicle having a ceiling, a floor, and at least one interior wall which is substantially vertical, said module comprising:
    (a) a body portion having a generally curved wall, first and second open ends, and an open top;
    (b) first and second end walls attached to said first and second open ends of said body portion, at least one of said end walls being substantially flat, each of said end walls having an interior surface facing the interior of said body portion and an exterior surface facing the interior of said vehicle when said module is inserted into said space vehicle, a plurality of reinforcing ribs being positioned on the interior surface of each of said end walls, said reinforcing ribs comprising first and second sets of parallel reinforcing ribs, wherein said first and second sets of reinforcing ribs intersect each other;
    (c) a plurality of tie rods, each of said tie rods having first and second ends, a plurality of said tie rod ends being attached to said first and second end walls to secure said end walls and said body portion to each other; and
    (d) a top panel positioned on said open top of said body portion, wherein at least one of said top panels and said end walls includes an opening to permit passage between said module and said vehicle.

2. A module in accordance with claim 1 wherein one of said end walls includes said opening, said opening being adapted to receive a connecting tunnel which is adapted to be attached to said interior vertical wall of said space vehicle.

3. A module in accordance with claim 2 wherein said opening is part of a hatch which further comprises a pivotable door for selectively closing said opening.

4. A module in accordance with claim 1 wherein said top panel includes said opening and a pivotable door for selectively closing said opening.

5. A module in accordance with claim 1 wherein connecting elements are attached to said reinforcing ribs, and wherein the ends of said tie rods are attached to said connecting elements.

6. A module in accordance with claim 1 wherein said top panel has an interior surface and an exterior surface and includes a plurality of reinforcing ribs positioned on said interior top panel surface.

7. A module in accordance with claim 1 wherein one of said end walls incorporates a recessed portion on an exterior surface of said at least one flat end wall, said opening being located within said recessed portion.

8. A module in accordance with claim 1, wherein the first and second ends of each of said tie rods are attached to opposed end walls to secure said end walls to each other.

9. A module adapted to be inserted into the interior volume of a space vehicle, said space vehicle having a ceiling, a floor, and at least one interior wall which is substantially vertical, said module comprising:
(a) a body portion having a generally curved wall, first and second open ends, and a selectively closable open top, said open top being substantially flat such that said body portion is substantially truncated;
(b) first and second end walls attached to said first and second open ends of said body, at least one of said end walls being substantially flat, each of said end walls having an interior surface facing the interior of said body portion and an exterior surface facing the interior of said vehicle when said module is inserted therein, wherein a plurality of reinforcing ribs are positioned on the interior surface of each of said end walls;
(c) a plurality of tie rods adapted to be attached to said first and second end walls in order to secure said end walls to said body portion and to each other; and
(d) a top panel selectively positionable on said open top of said body portion, said top panel having a surface area substantially equal to the surface area of said open top of said body portion, and means for selectively and detachably connecting said top panel to said open top of said body portion.

10. A module in accordance with claim 9, wherein at least one of said end walls is adapted to be positioned adjacent to said substantially vertical interior wall of said space vehicle, said at least one flat end wall including means for receiving a tunnel adaptor to form a passageway between said module and a passenger or cargo compartment of said space vehicle when said module is inserted in said space vehicle.

11. A module in accordance with claim 9 wherein each of said end walls of said module is substantially flat.

12. A module in accordance with claim 9, wherein a second of said end walls is substantially frustoconical, and wherein said at least one flat end wall is adapted to be positioned adjacent to said interior wall of said space vehicle.

13. A module in accordance with claim 9 wherein said body portion has the cross-sectional configuration of a truncated cylinder.

14. A module in accordance with claim 9 further comprising means for attaching said module to an interior surface of said space vehicle, said module attaching means comprising at least one trunnion fitting extending outwardly from an exterior surface of said body portion, said trunnion fitting being adapted to fit within an aperture the interior surface of said space vehicle.

15. A module in accordance with claim 9 wherein each of said end walls comprises first and second sets of parallel reinforcing ribs, said sets being arranged in a generally transverse fashion to each other.

16. A module in accordance with claim 15 wherein said two sets of ribs are arranged in a waffle-type structure extending inwardly from an inner surface of each of said end walls into the interior of said body.

17. A module in accordance with claim 16 wherein said first and second sets of ribs intersect at a plurality of junction points, said module further comprising a plurality of tie rods which connect said end walls to each other.

18. A module in accordance with claim 17 wherein said tie rods are attached to said end walls at said junction points.

19. A module in accordance with claim 17 further comprising apertures located at said junction points for receiving ends of said tie rods.

20. A module in accordance with claim 17 further comprising universal socket and ball joints formed by the attachment of free ends of respective rods to said rib junction points.

21. A module in accordance with claim 9 said body comprises an exterior skin and a plurality of generally U-shaped reinforcing rings positioned within said skin.

22. A module in accordance with claim 9 wherein at least one of said end walls includes an indentation in an exterior surface of said at least one end wall, said indentation comprising means for receiving a tunnel adaptor and for positioning said exterior wall surface adjacent to said interior vertical wall of said space vehicle.

23. A module in accordance with claim 9 further comprising a fan and an air diffuser within said body.

24. A module in accordance with claim 9 wherein said top panel comprises a hatch door pivotally connected to said, open top for selectively closing said opening.

25. A module in accordance with claim 9 wherein said body portion is in the form of a substantially truncated cylinder having open first and second opposed end walls and an open top, said body portion further comprising first and second ring frames and means for attaching said ring frames to said first and second opposed end walls, said first and second end walls being attached to said first and second ring frames, respectively, said rings being truncated and having the same configuration as the cross-section of said body portion.

26. A module in accordance with claim 9, wherein said top panel is generally rectangular and has a peripheral flange adapted to overlie said body top when said top panel is attached to said body.

* * * * *